Patented Apr. 22, 1924.

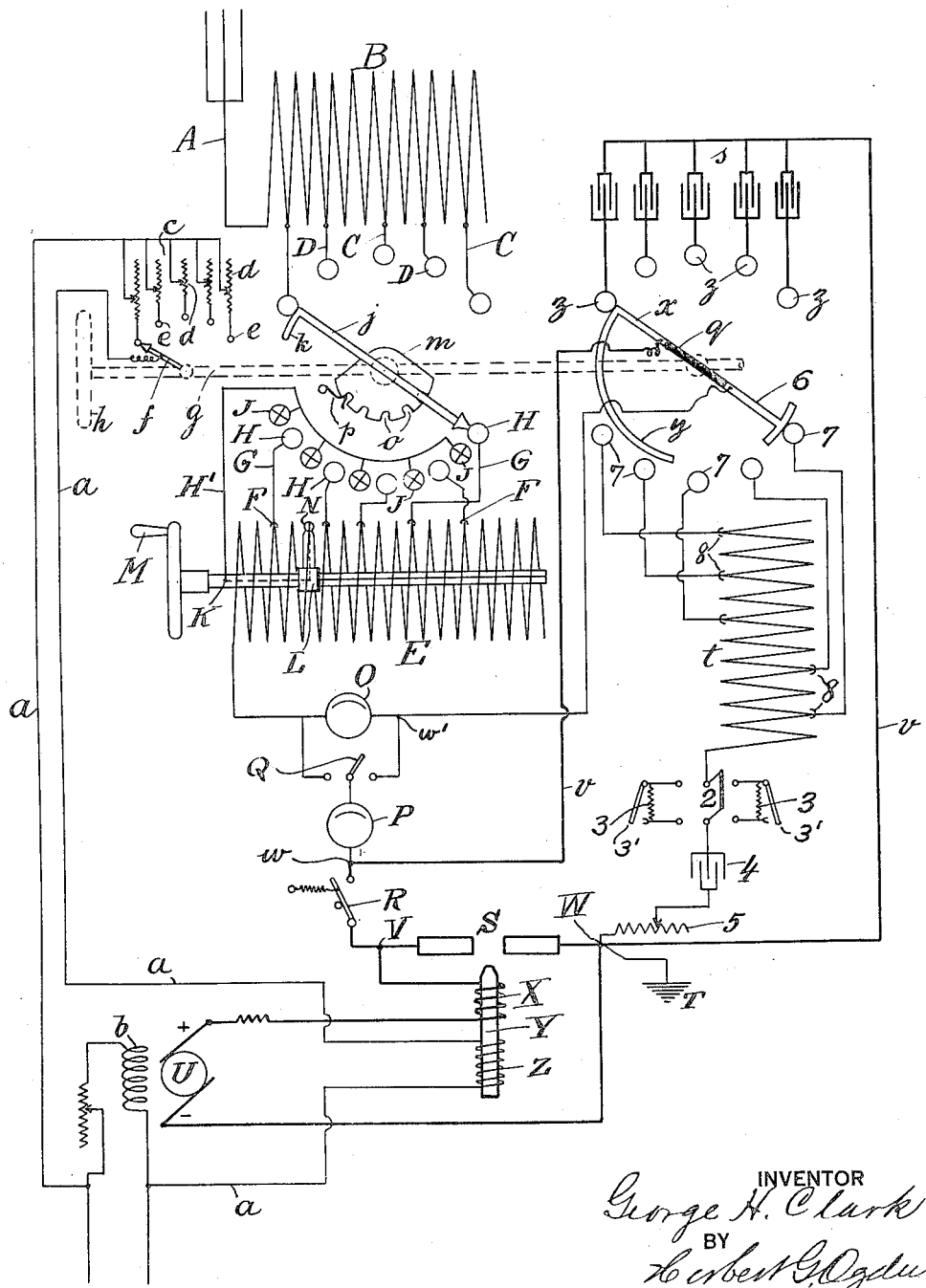

1,491,288

UNITED STATES PATENT OFFICE.

GEORGE HOWARD CLARK, OF WASHINGTON, DISTRICT OF COLUMBIA.

RADIO SIGNALING APPARATUS.

Application filed May 2, 1919. Serial No. 294,144.

*To all whom it may concern:*

Be it known that I, GEORGE H. CLARK, a citizen of the United States, and a resident of Washington, District of Columbia, have invented certain new and useful Improvements in Radio Signaling Apparatus, of which the following is a specification accompanied by drawings.

This invention relates to radio signaling apparatus and more particularly to wave changers for arc sets.

Important objects of the invention are to increase the electrical efficiency of wave changing apparatus, secure more exact tuning to predetermined wave lengths, and produce a wave changer for arc sets having its elements combined in a single complete composite unit, thus economizing the space required for the apparatus, which is of importance, especially on shipboard.

Further objects of the invention are to obtain maximum ease of operation, enable the operator to change from one wave length to another by using one hand only, and permit changing from any one wave length to any other while the arc is in operation, without requiring the arc to be shut down.

In connection with the wave changer, and controlled by the wave changing switch, I provide means especially adapted for shore stations, although also used on shipboard, for automatically connecting directly across the arc generator terminals the proper value of "booster" condenser for the wave length in use, and by so doing I am enabled to increase the radiated energy by about fifty per cent over that obtaining with the same generator voltage when the system is operated without the said condenser or condensers. Since the voltage obtained from a generator is limited substantially to that for which it is designed, the power of the transmitting set is inherently limited, unless "boosted" by the shunt condensers, in accordance with my invention, and for the most efficient operation, the proper value of condenser is automatically selected by the wave changing switch for each desired wave length.

Originally wave changing for arc sets was effected by means of a number of helices of comparatively large diameter, in series, with taps brought out to insulated clips, and a switch arm slidable along a rod served to cut in the desired wave length. This construction was inefficient electrically, and wasteful of space, which, obviously, are important considerations both on ship and shore stations. Sufficiently close tuning could not be obtained even with taps at every turn in the helices.

In order to overcome the various objections recited, I have designed and constructed my wave changer substantially in accordance with the accompanying drawing which is a diagrammatic representation of circuits and apparatus for carrying out the invention, parts unessential to an understanding of the invention being omitted, and the wave changing switch elements being shown side by side in the plane of the sheet, for clearness of illustration, instead of one behind the other in substantially parallel planes on the same shaft as in actual practice. The main operating switch shaft is shown in dotted lines to indicate that the construction is diagrammatic rather than in mechanical perspective, the operative mechanical connections of the switching apparatus to the switch shaft being obvious to a mechanic or one skilled in the art to which this invention pertains.

In avoiding the difficulties heretofore encountered in wave changers for arc sets and with special reference to requirements for the United States Navy, I have redesigned the antenna loading coil, and I include in the wave changer a separate, fine adjustment coil for fine variations, with switching means co-operating with both coils simultaneously for various wave lengths. I also provide means as a part of the wave changer switch for simultaneously varying the capacity in shunt across the terminals of the arc, and for varying the constants of any circuit which may be used to control transmission of signals, so that these elements are varied in accordance with the wave length. In addition, the arc flux controlling leads may be connected to be controlled by the wave changer switch.

In accordance with my invention, the wave changer will make the following transfers or adjustments automatically and simultaneously by a single mechanical operation when changing from one wave length to another;

1. Connect in the antenna circuit the loading coil tap which gives most nearly the desired wave length.

2. Connect in the antenna circuit the tap on the adjusting coil which gives substantially the exact wave length desired, when used in connection with the value of loading coil provided.

3. Connect across the arc generator terminals the proper value of "booster" condenser for the wave length in use. This is preferably for shore stations and may be omitted if desired for ship stations, although extremely useful on shipboard in many cases.

4. Provide the proper electrical constants necessary for the operation of the signal control system in use, for each particular wave length.

5. And additionally vary by appropriate means the magnetic flux operating on the arc so as to provide the proper flux for the wave length used.

Referring to the drawing, which is a simplified diagram of the actual circuits and connections for standard Navy apparatus, A represents an antenna and B the antenna loading coil, preferably wound with Litzendraht, which is made of stranded, insulated conductors forming a single conductor of low radio-frequency resistance. The total inductance of the loading coil B should be such as to afford the total wave length range desired for a set of given size with the appropriate antenna capacity.

Leads C are brought out from suitable tap points to contacts D. The tap points are preferably so chosen, in connection with the total inductance of the adjusting or fine adjustment coil E, that the inductance of each tap of the antenna load coil B does not exceed 75% of the total available inductance of the adjusting coil E and the inductance between all taps on the antenna load coil should preferably be substantially equal. It is to be understood that when desired, as for instance, for shipboard sets, the loading coil B, adjusting coil E and wave changing mechanism may be combined complete as a single composite wave changing unit.

For substantially exact tuning to predetermined wave lengths, the relatively small adjusting inductance E is provided, the value of which in milli-henrys may preferably be about 1.3 times the inductance between steps of the loading inductance B. The adjusting inductance E is preferably constructed of strip copper in order to reduce the dimensions and for additional mechanical and electrical reasons.

The adjusting inductance E is provided with adjustable clips F connected by leads G to working position contacts H corresponding in number to the contacts D for the loading coil B. Another set of adjusting position contacts J may be conveniently arranged alternately with contacts H and connected by connection H' to each other and to the revoluble shaft K carrying the adjusting switch arm L adapted to be rotated as by means of the crank handle M. The rotating arm L is provided with a clip N at its end for making contact with inductance E as the arm travels along the coil when rotated.

Adjusting inductance E as shown is suitably connected, preferably through radiation ammeters O and P, radiation meter transfer switch Q and arc extinguishing contactor R to one electrode of the arc S, the other electrode being connected to ground at T. The direct current generator U furnishes current for the arc, the leads from the generator being connected to the arc circuit at the points V and W respectively, and a series blow out coil X for the arc is preferably included in one lead, and wound on the core Y. A separately excited blowout coil Z also wound on the core Y may be conveniently included in a circuit $a$ in shunt to the generator shunt field winding $b$, and the flux control rheostat $c$ comprising the adjustable resistances $d$, contacts $e$, and rheostat arm $f$, are also included in the blowout coil circuit $a$, the foregoing forming one possible means for obtaining convenient variation of arc magnetic flux.

The rheostat arm $f$, as shown, is suitably mounted on the wavechanger switch shaft $g$, shown in dotted lines for the reasons hereinbefore explained, and adapted to be rotated by means of a suitably insulated handle $h$. Also suitably mounted on wave changer shaft $g$, is a wave changer arm $j$, in this instance electrically continuous and adapted to co-operate with the contacts for the loading coil B and adjusting coil E. As shown, that end $k$ of wave changer arm $j$ which travels over contacts D for the loading coil is preferably broadened in L shaped form in order that the wave changer may be moved to either the adjusting contact J or the operating contact H for any given wave length without opening the antenna circuit.

The circuit from the loading coil B to and through the adjusting coil E, at any one wave length, may be made in either of two ways, as follows:

(1) When the wave changer arm $j$ is on the "adjusting" position, as it may be termed, that is, co-operating with a contact D and an intermediate adjusting contact J, the circuit passes from the loading coil B, through wave changer arm $j$, to a contact J, thence to the shaft K, rotating arm L, through a portion of the adjusting coil E, and thence to the arc, as indicated on the drawing. Thus, by rotating shaft K and arm L, any value of the adjusting coil E may be cut in circuit.

(2) When the wave changer arm $j$, is on the "working" position, as it may be called, that is, co-operating with a contact D and a working contact H, the circuit passes from the loading coil B through arm $j$, to a contact H, thence to its corresponding clip F on adjusting coil E. The position of that particular clip F corresponds to the position found by the rotating arm L; i. e., the clip F cuts in the same number of turns to the nearest half turn found necessary by the operation outlined in paragraph (1) immediately above.

The inductance per turn of the adjusting coil E should preferably be such as to permit of obtaining a wave length accuracy of one per cent when adjusting to any wave length within the range of the set.

Positive means are also preferably employed for automatically stopping the wave changer arm $j$ exactly at the proper point of contact for a given wave length on the "working" position contacts. As shown a segment $m$ is mounted on the shaft $g$ having notches $o$ corresponding in number to the working contacts H and adapted to co-operate with a spring detent $p$ for holding the segment and arm $j$ in a given position as the detent springs into a notch.

When the wave changer arm $j$ is on the adjusting position, as explained, for any wave length, the antenna circuit passes through the rotary arm L of the adjusting inductance E, through the adjusting inductance or a portion of the same, and thence to the arc. Hence, variation of the adjusting coil E by rotating the arm L will vary the wave length of the arc. By placing the wave changer arm $j$ on the "working" position as explained, for this same wave length, and by moving the clip F corresponding to the particular working contact H in circuit, to the position on the adjusting coil E nearest the final position found by the rotary arm L, the set is left tuned correctly to the desired wave length.

Change from any one wave length to any other is effected while the arc is in operation and without requiring the arc to be shut down. Changing from one wave length to another is also made possible by the use of one hand only of the operator, which is of great practical importance.

Simultaneously with the movements of the wave changer arm $j$, it will be seen that movement of the rheostat arm $f$ is effected, to control the rheostat $c$ and connect in series with the shunt compounding magnet coil Z, the value of series resistance $d$ which gives the proper field strength for the wave length used, in connection with the flux existing in the series magnet coil X.

Also suitably mounted on the wave changer shaft $g$ is shown the switch arm $q$ adapted to control the "booster" condensers $s$ in shunt directly across the arc and the electrical constants of the signal control system, simultaneously with change of wave length.

The condenser circuit $v$ is shown in black lines, similarly to the generator circuit, and is conveniently connected between the point W at one side of the arc and the point $w$ at the other side of the arc adjacent to the arc extinguishing contactor R. The switch arm $q$ is preferably provided with a central insulating portion and one conducting end $x$ having a curved or arc shaped portion $y$ is adapted to co-operate with contacts $z$ connected to the condensers $s$ as shown. The curved contact portion $y$ of arm $q$ is of sufficient length to include all the condensers $s$ in circuit at once in the final position of the switch.

In addition to the advantages already pointed out, I have found that the shunt condenser or condensers causes the carbons to burn much longer and they burn with a so-called "head," rather than with tapering points, as when no condenser is used. Furthermore, and this is of great importance, the arc is more stable.

The booster circuit should have a minimum inductance, as long leads have been found to materially reduce the efficiency of the booster circuit. Substantially the whole effect of the booster circuit is apparently one of wave length rather than capacity, the wave length of the booster circuit probably being some harmonic of the main wave. The fact that as various condensers are added, with substantially constant inductance, peaks of "boost," as it were, appear, with hollows between, indicates that wave length plays its part. I am therefore inclined to the view that some inductance is probably essential, and that the ratio of inductance to capacity in the booster circuit is a material factor, the inductance being preferably low but by no means negligible, so that the ratio of capacity to inductance should preferably be relatively large. In fact I have found that this ratio should preferably be extremely large.

As a form of signal control is shown an absorbing circuit, shown in light lines. This is conveniently connected between the point W at one side of the arc and the point $w'$ adjacent the radiation meter O. The absorbing circuit as shown includes the inductance $t$; the relay transfer switch 2 for the duplicate relay keys, indicated at 3, but not shown in full; the condenser 4, and the variable power balancing resistance 5.

The arc system shown in the drawing can be used for any type of transmission but by way of example I have shown resistances 3 adapted to be thrown in and out of circuit with the inductance $t$ and capacity 4 of the absorption circuit. Switches 3' illustrate diagrammatically the means for short circuiting the resistance 3. The resistances are shown in duplicate so that either the one or the other may be used by proper throwing of the switch 2, as will be clear from the drawing. Signals will be sent by opening and closing the short circuit around the resistance 3, as is well known in the art. When the switch 3' is open the oscillations will be sent into the antenna A and when closed the oscillations will pass into the absorption circuit and no signaling wave will be sent from the antenna. The energy is diverted from the antenna circuit and entirely taken up in the absorbing circuit when the resistance referred to is removed. When the said resistance is inserted, the energy is withdrawn from the absorbing circuit and transferred to the antenna circuit.

It is especially desirable to individually adjust the absorbing circuit inductance $t$, for various wave lengths within the range, in accordance with movements of the wave changer switch. As shown, the conducting end 6 of the switch arm $q$ is adapted to cooperate with contacts 7 connected by leads to adjustable clips 8 on the absorbing circuit inductance $t$. In the drawing it is to be understood that the arc shaped portion $y$ of the arm $q$ does not make contact with the contacts 7 in the operation of the switch.

In the operation of the wave changer it is obvious that manipulation of the handle $h$ on main wave changer switch shaft $q$ simultaneously actuates the wave changer arm $j$, the rheostat arm $f$ and the switch arm $q$. In so doing, five transfers are accomplished automatically and simultaneously, when changing from one wave length to another, which may now be summarized as follows:

(1) The loading coil contact D which most nearly gives the desired wave length is connected in the antenna circuit.

(2) The corresponding adjusting coil contact H or J which gives the exact wave length desired, is connected in the antenna circuit, the value of loading coil having been predetermined.

(3) The proper value of "booster" condenser $s$ for the wave length in use is connected directly across the arc generator terminals.

(4) The required electrical constants $t$ for the operation of the control relay circuits 3 at that wave length are connected in circuit.

(5) The required value of series resistance $d$ is connected in series with the separately excited blowout coil Z to give the proper field strength for the wave length used.

I claim and desire to obtain by Letters Patent, the following:

1. In radio signaling apparatus, the combination with an antenna and source of continuous oscillations, of wave changing means including a loading coil and a fine adjustment coil in the antenna circuit, switch arms adapted to make contact with said coils and means for connecting said arms to cause simultaneous movement to provide coarse and fine adjustment.

2. In radio signaling apparatus, the combination with an antenna and arc generator, of wave changing means including a variable loading inductance and a fine adjustment inductance in the antenna circuit, and common means for simultaneously connecting in circuit predetermined portions of said inductance for a desired wave length.

3. In radio signaling apparatus, the combination with an antenna and source of oscillations, of wave changing means including a variable loading coil and a fine adjustment coil in the antenna circuit, and common means for simultaneously connecting in circuit that portion of the loading coil which most nearly gives the desired wave length, and that portion of the adjustment coil which gives substantially the exact wave length desired when used in connection with the said value of loading coil selected.

4. In radio signaling apparatus, the combination with an antenna and source of continuous oscillations, of wave changing means, including a variable loading inductance and a variable fine adjustment and inductance in the antenna circuit, and common means capable of actuation by a single mechanical operation for simultaneously connecting in circuit a predetermined portion of the loading inductance which most nearly produces the desired wave length, and a corresponding portion of the fine adjustment inductance which produces substantially the exact wave length desired in co-operation with the said predetermined value of loading inductances selected.

5. In radio signaling apparatus, the combination with an antenna and source of continuous oscillations, of wave changing apparatus, including a variable loading coil divided into sections, the total inductance of the coil being sufficient to afford the desired range of wave lengths, and a variable fine adjustment coil of smaller value, in the antenna, the inductance of each section of the loading coil not substantially exceeding about seventy-five per cent of the total inductance of the fine adjustment coil, switch arms adapted to make contact with said coils and means for moving said arms in unison to provide coarse and fine adjustment of inductance.

6. In radio signaling apparatus, the combination with an antenna and source of continuous oscillations, of wave changing apparatus, including a variable loading coil divided into sections, the total inductance of the coil being sufficient to afford the desired range of wave lengths, and a variable fine adjustment coil of smaller value, in the antenna circuit, the inductance of each section of the loading coil not exceeding about seventy-five per cent of the total inductance of the fine adjustment coil, and interconnecting means for simultaneously connecting in circuit that section of the loading coil which most nearly produces the desired wave length and that portion of the fine adjustment coil which produces substantially the exact wave length and means for varying the inductance of the adjustment coil while holding the selected value of the loading coil.

7. In radio signaling apparatus, the combination with an antenna and source of oscillations, of wave changing apparatus, including in the antenna circuit a variable loading coil divided into sections and contacts connected thereto, and a fine adjustment coil divided into sections and working contacts connected thereto, a series of adjusting contacts adjacent said working contacts and connected in circuit with the source of oscillations, and switching mechanism adapted to co-operate with the said loading coil contacts, the adjusting contacts and the working contacts for determining wave length.

8. In radio signaling apparatus, the combination with an antenna and source of oscillations, of wave changing apparatus, including in the antenna circuit a variable loading coil divided into sections and contacts connected thereto, and a fine adjustment coil divided into sections and working contacts connected thereto, a series of adjusting contacts adjacent said working contacts and connected in circuit with the source of oscillations, and switching mechanism adapted to co-operate with the said loading coil contacts, the adjusting contacts and the working contacts for determining wave length, and additional means for separately varying the inductance of the sections of the said fine adjusting coil.

9. In radio signaling apparatus, the combination with an antenna and source of oscillations, of wave changing means including a loading coil and a fine adjustment coil in the antenna circuit, means for simultaneously varying said coils, and independent means for separately varying the fine adjustment coil.

10. In radio signaling apparatus, the combination with an antenna and source of oscillations, of wave changing means including a variable loading coil and a fine adjustment coil in the antenna circuit, common means for simultaneously connecting in circuit that portion of the loading coil which most nearly gives the desired wave length, and that portion of the fine adjustment coil which gives substantially the exact wave length desired when used in connection with the said value of loading coil selected, and independent means for separately varying the several portions of the said fine adjustment coil.

11. In radio signaling apparatus, the combination with an antenna and source of continuous oscillations, of a loading coil and a fine adjustment coil in the antenna circuit, a signal controlling circuit suitably connected, switching members for said coils and connecting circuit, and interconnecting means between said members for simultaneously varying the inductance of the said loading coil, fine adjustment coil, and signal control circuit constants for changing wave lengths.

12. In radio signaling apparatus, the combination with an antenna and source of continuous oscillations, of a loading coil and a fine adjustment coil in the antenna circuit, capacity in shunt directly around the source, a signal control circuit suitably connected, switching members connected to said coils, capacity and control circuit, and an interconnecting means between said members for simultaneously varying said loading coil and fine adjustment coil, capacity in shunt to the source, and signal control circuit constants for changing wave lengths.

13. In radio signaling apparatus, the combination with an antenna and arc generator, of a loading coil and a fine adjustment coil in the antenna circuit, a booster condenser directly in shunt to the arc, switch members connected to said coils and condenser, and interconnecting means between said members for simultaneously varying the inductance of said loading coil and fine adjustment coil and the value of said condenser for changing wave lengths.

14. In radio signaling apparatus, the combination with an antenna and arc generator, of magnetic flux producing means for the arc, means for varying said flux producing means, a loading coil and a fine adjustment coil in the antenna circuit, a booster condenser directly in shunt around the arc, a signal control circuit including inductance and capacity suitably connected to the arc, adjusting members for said coils, condenser, inductance and capacity and interconnecting means between said members and said first mentioned means for producing simultaneous adjustment of the same while changing the radiated wave length.

15. In signaling apparatus, a coil, an adjusting arm adapted to connect with portions of said coil, a plurality of contacts adapted to be connected by leads to said coil, a switch arm adapted to engage said contacts and means to connect said switch arm to the adjusting arm when it is out of engagement with said contacts.

16. In signaling apparatus, a coil, an adjusting arm adapted to connect with portions of said coil, a plurality of contacts adapted to be connected by leads to said coil, a second coil and means to connect a desired portion of said second coil alternately to one of said contacts or to said adjusting arm.

17. In signaling apparatus, a helical coil of wire, a rotating arm adapted to make contact with said wire, a plurality of terminal blocks adapted to be connected by leads to said wire, a switch arm adapted to engage said blocks and means to electrically connect said rotating arm to said switch arm when it is out of engagement with said blocks.

18. In signaling apparatus, a helical coil of wire, a rotating arm adapted to make contact with said wire, a plurality of terminal blocks adapted to be connected by leads to said wire, a plurality of contacts adjacent to said blocks connected to said rotating arm and a switch arm adapted to alternately engage said blocks and said contacts.

19. In signaling apparatus, a helical coil of wire, a rotating arm adapted to engage said wire, a plurality of terminal blocks adapted to be connected by leads to said wire, a plurality of contacts adjacent to said blocks and connected to said switch arm, a second coil and a switch arm adapted to connect a desired portion of said second coil alternately to said blocks and said contacts.

In testimony whereof I have signed this specification in the presence of two subscribing witnesses.

GEORGE HOWARD CLARK.

Witnesses:
GEORGE B. CROUSE,
JULIA GRAAF.